United States Patent [19]

Okai et al.

[11] Patent Number: 4,946,219

[45] Date of Patent: Aug. 7, 1990

[54] ROOF SIDE SEALING MECHANISM FOR AUTOMOTIVE VEHICLE HAVING A HOOD ATTACHED THERETO

[75] Inventors: Harumi Okai; Yukiya Takada, both of Hamamatsu, Japan

[73] Assignee: Suzuki Motor Company, Ltd., Shizuoka, Japan

[21] Appl. No.: 330,117

[22] Filed: Mar. 29, 1989

[30] Foreign Application Priority Data

May 18, 1988 [JP] Japan ................................. 63-120968

[51] Int. Cl.$^5$ .............................................. B60J 7/10
[52] U.S. Cl. .................................... 296/213; 296/102
[58] Field of Search ............... 296/213, 102, 154, 208, 296/135

[56] References Cited

U.S. PATENT DOCUMENTS

| 2,435,523 | 3/1948 | Weaver et al. | 296/135 |
| 2,785,003 | 3/1957 | Zaravsey | 296/135 |
| 4,694,774 | 9/1987 | Keithley, Jr. | 296/100 |

Primary Examiner—Margaret A. Focarino
Assistant Examiner—Gary C. Hoge
Attorney, Agent, or Firm—McGlew & Tuttle

[57] ABSTRACT

A roof side sealing mechanism usable for an automotive vehicle of the type having a hood attached thereto, wherein a hood pad is provided inside of the side surface of the hood and a sealer wrap is provided in the interior of the hood, one end of the sealer wrap being secured to the inner surface of the hood at a predetermined position and the other end of the same serving as a free end which is located along a boundary or a gap between the lower end of the side surface of the hood and the upper end of a door sash.

3 Claims, 2 Drawing Sheets

ROOF SIDE SEALING MECHANISM FOR AUTOMOTIVE VEHICLE HAVING A HOOD ATTACHED THERETO

FIELD OF THE INVENTION AND RELATED ART STATEMENT

The present invention relates to a roof side sealing mechanism usable for an automotive vehicle of the type having a hood attached thereto.

As shown in FIG. 1, some automotive vehicles each having a hood attached thereto, are so constructed that a roof 1 is covered with a hood cloth which can be removed from a vehicular body 2 in response to a requirement.

To facilitate understanding of the present invention, a conventional structure of the upper side of an automotive vehicle of the type having a hood attached thereto will be described below with reference to FIG. 3(a) and FIG. 3(b).

FIG. 3(a) shows by way of enlarged cross-sectional view that a hood 31 is placed simply over the roof 1. With this construction, water is liable to be introduced into the interior of a vehicular body 2 through a gap 34 between the lower end 32 of the side surface of the hood 31 and the upper end 33 of a door sash 33. Further, the hood 31 tends to violently flutter under the influence of wind which has been introduced thereinto through the gap 34 during a period of cruising of the vehicle.

To obviate the foregoing problems, it has been proposed that a roof side frame 35 is wrapped by a sealer wrap 36 and then it is immovably held using a clip 37, as shown in FIG. 3(b). Although this construction provides an improved watertightness, however, it has been found that the above proposal has drawbacks that a fitting operation is performed for the conventional roof side sealing mechanism with much difficulties and moreover the conventional roof side sealing mechanism is produced at an expensive cost.

OBJECT AND SUMMARY OF THE INVENTION

The present invention has been made with the foregoing background in mind and its object resides in providing a roof side sealing mechanism usable for an automotive vehicle of the type having a hood attached thereto, wherein a hood pad is provided inside of the side surface of the hood and a sealer wrap is provided in the interior of the hood, one end of the sealer wrap being secured to the inner surface of the hood at a predetermined position and the other end of the same serving as a free end which is located along a boundary or a gap extending between the lower end of the side surface of the hood and the upper end of a door sash.

The roof side sealing mechanism of the present invention assures that an occurrence of fluttering of the hood can reliably be prevented, properties of appearance and watertightness can be improved, a fitting operation can easily be performed for the roof side sealing mechanism and the latter can be produced at an inexpensive cost.

Other objects, features and advantages of the present invention will be more readily apparent from a reading of the following description which has been made with reference to the accompanying drawings.

BRIEF DESCRIPTION OF THE DRAWINGS

The present invention will be illustrated in the following drawings in which.

DETAILED DESCRIPTION OF THE PREFERRED EMBODIMENT

Now, the present invention will be described in a greater detail hereinafter with reference to the accompanying drawings which illustrate a preferred embodiment thereof.

Figure 1:
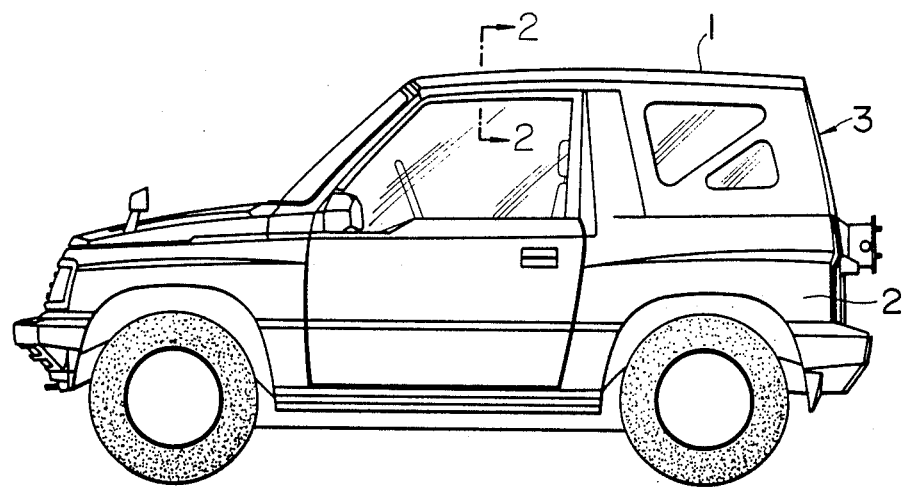
FIG. 1 is a side view illustrating a motorcar of the type having a hood attached thereto for which a roof side sealing mechanism in accordance with the present invention is employed.

FIG. 1 shows by way of side view a motorcar 3 of the type having a hood attached thereto for which a roof side sealing mechanism in accordance with the present invention is employed. As will be apparent from the drawing, the motorcar 3 includes a roof 1 which is covered with a hood cloth adapted to be removed from a vehicular body 2 as required.

Figure 2:
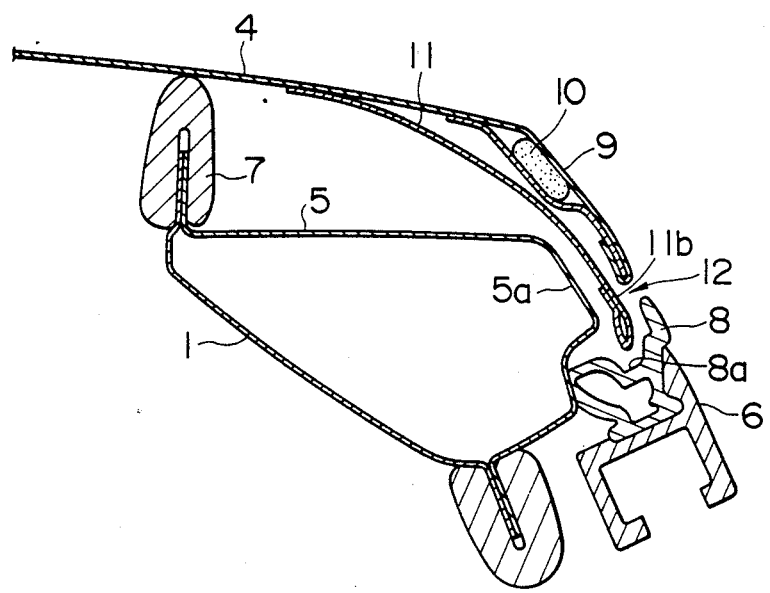
FIG. 2 is an enlarged sectional view of the roof side sealing mechanism of the present invention taken the direction of a line A—A in FIG. 1.

FIG. 2 shows by way of enlarged cross-sectional view the roof side sealing mechanism of the present invention. In the drawing, reference numeral 4 designate a hood cloth, reference numeral 5 designates a roof side frame and reference numeral 6 designates a door sash. To assure an excellent property of sealability, the roof side frame 5 is provided with a weather strip 7 at its upper end part and the door sash 6 is provided also with a weather strip 8 at its upper end part.

The roof side frame 5 has a side surface 5a which is situated appreciably inside of the outer surface of the door sash 6 in order to arrange a hood pad and a sealer wrap both of which will be described later. The hood pad and the sealer wrap constitute characterizing features of the present invention.

The hood cloth 4 has a side surface portion 9 so that a roof pad 10 or hood pad constituting one of the characterizing features of the present invention is extended along the inside of the the side surface portion 9 in the longitudinal direction of the vehicular body 2.

Referring to FIG. 2 again, reference numeral 11 designates a sealer wrap. One end 11a of the sealer wrap 11 is adhesively secured to the inner surface of the hood cloth 4 along the region extending in the longitudinal direction in the proximity of the side surface of the vehicular body 2. The other end 11b of the sealer wrap 11 serves as a free end. Specifically, the free end part 11b of the sealer wrap 11 is located along a gap 12 between the lower end of the side surface of the hood cloth 4 and the upper end of the sash 6, and the lowermost end of the free end part 11b is located in a recess 8a on the weather strip 8.

It should be noted that the gap 12 longitudinally extending between the lower end of the side surface of the hood cloth 4 and the upper end of the door sash 6 is provided in such a manner as to exhibit a good appearance.

Figure 3A:
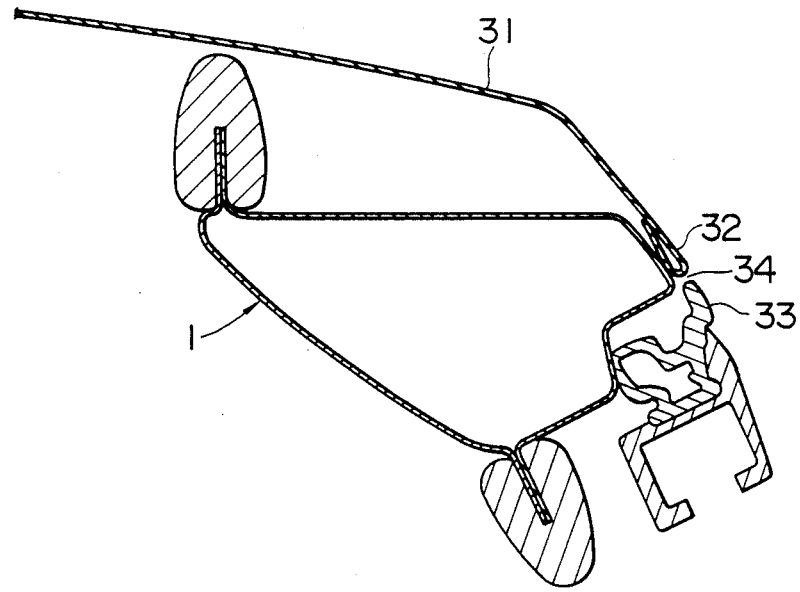
FIG. 3(a) is an enlarged sectional view of a conventional roof side sealing mechanism taken in the direction of a line A—A in FIG. 1.
Figure 3B:
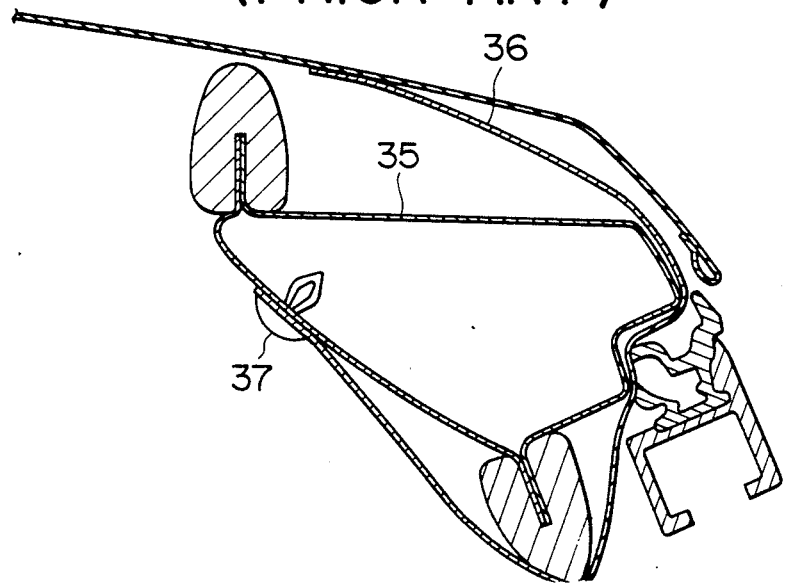
FIG. 3(b) is an enlarged sectional view of another roof side sealing mechanism taken in the direction of line A—A in FIG. 1.

With the roof side sealing mechanism of the present invention as constructed in the above-described manner, the side surface of the hood is firmly retained by the hood pad 10 so that an occurrence of fluttering of the hood during a period of cruising of the motorcar can be prevented reliably. Since the side surface of the hood is retained by the hood pad 10 in that way and moreover the free end part 11b of the sealer wrap 11 is located between the lower end of the side surface of the hood cloth 4 and the upper end of the sash 6, an excellent watertightness is assured. Further, since the sealer wrap 11 can visually be recognized through the gap 12 between the lower end of the side surface of the hood cloth 4 and the upper end of the sash 6 but the roof side frame 5 can not be seen therethrough, the roof side sealing mechanism of the present invention provides a good appearance. Additionally, since there is no need of using a clip such as the clip 37 as is the case with the conventional roof side seal shown in FIG. 3(b), a fitting operation can easily be performed and moreover the roof side sealing mechanism of the present invention can be produced at an inexpensive cost.

We claim:

1. A roof side sealing mechanism for an automotive vehicle of the type having a hood removably attached thereto, comprising:

a roof side frame for support of the hood including a frame side surface withdrawn inwardly of a door sash a predetermined distance in a door sash closed position, and including a lateral frame surface contacting a door sash weather strip in the door sash closed position; a roof side frame weather strip element connected to the roof side frame disposed above the roof side frame for contact with the hood; a hood pad provided inside a side surface of the hood, the side surface of the hood extending downwardly a distance to adjacent said door sash and defining a gap between said side surface of the hood and an upper end of said door sash; a sealer wrap provided in the interior of the hood, one end of said sealer wrap being secured to the inner surface of said hood at a predetermined position and another end of said sealer wrap being provided as a free end positioned adjacent said gap, said sealer wrap extending a distance beyond said side surface of said hood and beyond said gap.

2. A roof side sealing mechanism according to claim 1, wherein said lowermost free end of said sealer wrap is located in a recessed part of said door sash weatherstrip.

3. A roof side sealing mechanism for an automotive vehicle of the type having a hood removably attached thereto, comprising:

a roof side frame for support of the hood including a frame side surface withdrawn inwardly of a door sash a predetermined distance in a door sash closed position, and including a lateral frame surface contacting a door sash weather strip in the door sash closed position; a roof side frame weather strip element connected to the roof side frame disposed above the roof side frame for contact with the hood; a hood pad provided inside a side surface of the hood providing structural rigidity to said hood, the side surface of the hood extending downwardly a distance to adjacent said door sash and defining a gap between said surface of the hood and an upper end of said door sash; a sealer wrap provided in the interior of the hood, said roof side frame predetermined distance being greater than the thickness of said hood pad and said sealer wrap, one end of said sealer wrap being secured to the inner surface of said hood at a predetermined position and another end of said sealer wrap being provided as a free end positioned adjacent said gap, said sealer wrap extending a distance beyond said side surface of said hood and beyond said gap.

* * * * *